(No Model.)

J. J. ARMSTRONG & A. S. LOWREY.
CORN AND COTTON PLANTER.

No. 355,115. Patented Dec. 28, 1886.

WITNESSES
F. L. Ourand
Edward Stounton

INVENTORS
John J. Armstrong
Andrew S. Lowrey
By Louis Bagger & Co. Attorneys

N. PETERS, Photo-Lithographer, Washington, D. C.

UNITED STATES PATENT OFFICE.

JOHN J. ARMSTRONG AND ANDREW S. LOWREY, OF WEIMAR, TEXAS, ASSIGNORS OF ONE-THIRD TO W. C. MUNN, OF SAME PLACE.

CORN AND COTTON PLANTER.

SPECIFICATION forming part of Letters Patent No. 355,115, dated December 28, 1886.

Application filed May 17, 1886. Serial No. 202,370. (No model.)

*To all whom it may concern:*

Be it known that we, JOHN J. ARMSTRONG and ANDREW S. LOWREY, both residents of Weimar, in the county of Colorado and State of Texas, have invented certain new and useful Improvements in Corn and Cotton Planters; and we do hereby declare that the following is a full, clear, and exact description of the invention, which will enable others skilled in the art to which it appertains to make and use the same, reference being had to the accompanying drawings, which form a part of this specification, and in which—

Figure 1:
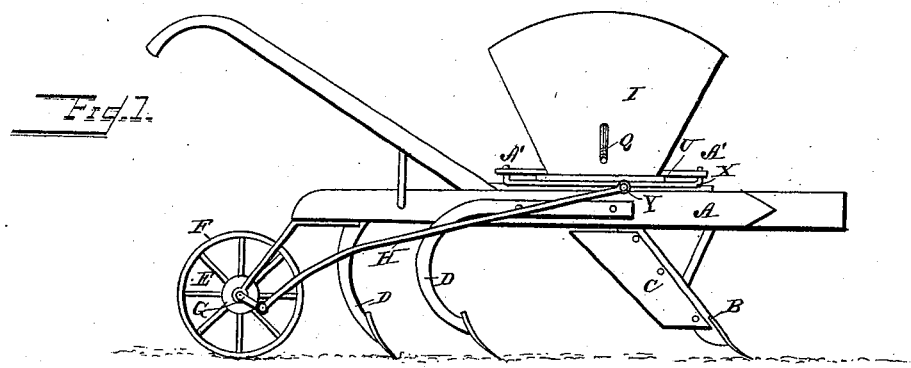
Figure 2:
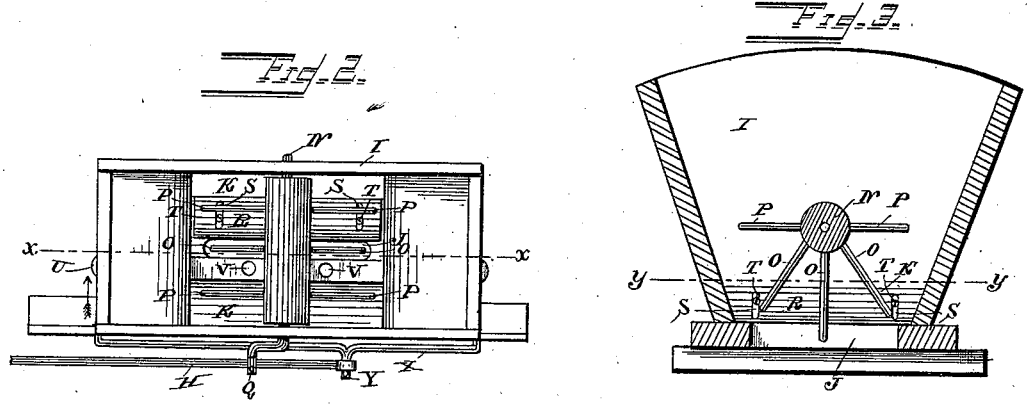
Figure 3:
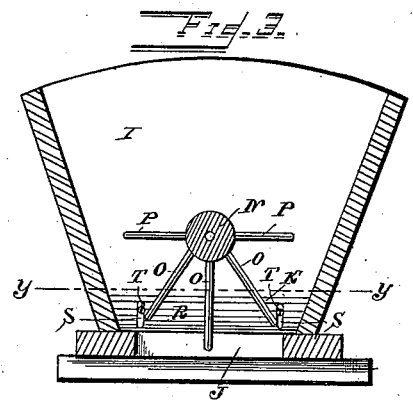
Figure 4:
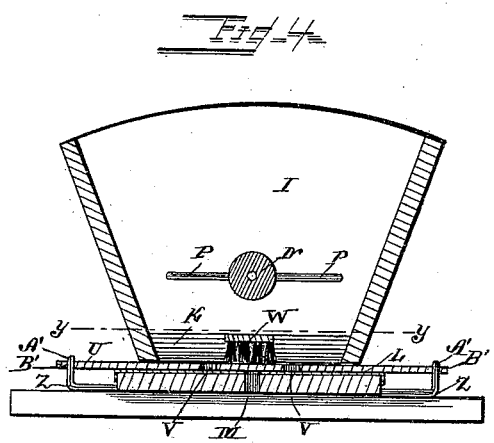
Figure 5:
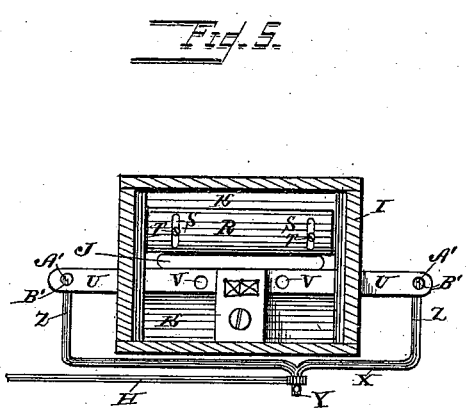

Figure 1 is a side view of our improved combined corn and cotton planter. Fig. 2 is a top view of the seed-box. Fig. 3 is a longitudinal vertical sectional view on line $x\,x$, Fig. 2, looking toward the adjustable plate. Fig. 4 is a similar view looking toward the corn-planting apparatus; and Fig. 5 is a horizontal sectional view on line $y\,y$, Figs. 3 and 4.

Similar letters of reference indicate corresponding parts in all the figures.

Our invention has relation to combined corn and cotton planters; and it consists in the improved construction and combination of parts of a planter in which the cotton-planting attachment may remain in the seed-box while planting corn and the corn-planting attachment may remain when planting cotton, as hereinafter more fully described and claimed.

In the accompanying drawings, the letter A indicates the frame of the planter, which frame is provided with an opening-shovel and standard, B, and a seed-tube, C, and with covering-shovels and standards D D at the rear end. A spoke-wheel, E, having a removable tire, F, is journaled in the rear end of the frame, and the shaft of this wheel has a crank, G, at one end, to which crank a pitman, H, is pivoted. The seed-box I has a longitudinal slot, J, in its bottom, and has two inclined portions, K K, at the sides of the bottom inclining toward the slot, and a flat longitudinal way, L, having a vertical perforation, M, at its middle.

A shaft, N, is journaled transversly in the seed-box, and has downwardly-projecting fingers O and pins P passed transversely through the ends of the shaft, and one end of the shaft is provided with a crank, Q, to which the forward end of the pitman may be pivoted. The fingers of the shaft project into the longitudinal slot, serving to stir up the cotton-seed and to force it through the slot, and the slot may be adjusted at different widths by means of a plate, R, upon one of the inclined sides of the bottom, sliding with slots S S upon screws T T passing into the inclined portion, and bearing with their heads against the edges of the slots.

A slide or bar, U, having two perforations, V V, slides in the way in the bottom of the seed-box at one side of the longitudinal slot, projecting through the ends of the seed-box with its ends, and a brush, W, is secured to the middle of the inclined portion of the bottom of the seed-box at the side of the slide, and projects with its bristles above the perforation in the middle of the way.

A bar, X, having an outwardly-projecting pin, Y, at its middle, to which pin the forward end of the pitman may be attached, has its ends Z Z bent inward and formed with upwardly-projecting ends A' A', which project into perforations B' B' in the ends of the slide, and it will be seen that a reciprocating motion may be imparted to the slide through the bar having its ends secured to the ends of the seed-slide and through the pitman, which receives its motion from the crank and the spoke-wheel having the removable tire.

It will be seen that when it is desired to use the machine as a corn-planter the slotted plate upon the inclined portion of the bottom is adjusted to cover the entire slot, and the pitman is attached to the pin projecting from the bar operating the seed-slide, and when the machine is to be used as a cotton-planter the pitman is attached to the crank at the side of the seed-box, and the plate in the bottom of the box is adjusted so as to give the slot sufficient width to allow the cotton-seed to be forced through it. The seed-slide will drop seed on both portions of its stroke, the perforations in the slide or seed-cups registering with the perforation in the bottom of the box at the end of the forward and of the back stroke. The pins passing through the stirrer-shaft near the ends of the same are of a sufficient length to stop the shaft in its rocking, preventing it from making more than about one-fourth of a revolution, the ends of the pins striking the inclined portions of the bottom, so that these pins, besides aiding in stirring up the cotton-seed when the shaft is rocked, will prevent the shaft from making too much of a revolution, and thus engaging too much seed at each movement.

Having thus described our invention, we claim and desire to secure by Letters Patent of the United States—

1. In a combined corn and cotton planter having a stirrer, seed-box, and a driving-wheel, the bottom of said seed-box being provided with a slot and an aperture, the combination of a regulating-slide, a feed-slide, and a pitman, said seed-slide being provided with a frame having a pin upon the same side of the box as the crank on the stirrer-shaft, the end of said pitman being adapted to engage with either said crank or said pin, as and for the purpose shown and set forth.

2. In a combined corn and cotton planter, the combination of a seed-slide having perforations in its ends, a bar having an outwardly-projecting pin at its middle, and having its ends bent inward and thereupon upward, the upwardly-bent ends fitting in the perforations in the slide, and a pitman pivoted upon the pin, as and for the purpose shown and set forth.

In testimony that we claim the foregoing as our own we have hereunto affixed our signatures in presence of two witnesses.

JOHN J. ARMSTRONG.
ANDREW S. LOWREY.

Witnesses:
 ED. BAAR,
 JOHN WINTER.